(12) United States Patent
Oh et al.

(10) Patent No.: US 7,545,895 B2
(45) Date of Patent: Jun. 9, 2009

(54) HIGH PERFORMANCE W-CDMA SLOT SYNCHRONISATION FOR INITIAL CELL SEARCH WITH REDUCED HARDWARE

(75) Inventors: Ser Wah Oh, Johor (MY); Christopher Aldridge, Singapore (SG)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 560 days.

(21) Appl. No.: 10/486,168

(22) PCT Filed: Mar. 13, 2001

(86) PCT No.: PCT/SG01/00039

§ 371 (c)(1), (2), (4) Date: Sep. 1, 2005

(87) PCT Pub. No.: WO02/073823

PCT Pub. Date: Sep. 19, 2002

(65) Prior Publication Data

US 2006/0056552 A1    Mar. 16, 2006

(51) Int. Cl.
*H04L 7/00* (2006.01)
(52) U.S. Cl. .................. 375/354; 375/145; 375/149
(58) Field of Classification Search ................ 375/354
See application file for complete search history.

(56) References Cited

U.S. PATENT DOCUMENTS 5,500,620 A * 3/1996 Brown et al. ............... 329/300

6,421,380 B1 * 7/2002 Gu et al. ..................... 375/232
6,563,858 B1 * 5/2003 Fakatselis et al. ........... 375/148

OTHER PUBLICATIONS

"Generalised Hierarchical Golay Sequence for PSC with low complexity correlation using pruned efficient Golay correlators," TSG-RAN Working Group 1, Meeting No. 5, Jun. 1-4, 1999, Cheju, Korea, pp. 1-6.
Lo, F.L. et al., "Fast Cell Search During PN Code Phase Acquisition Using Adaptive Filters in AWGN Environment," 1999 IEEE Global Telecommunications Conference, Rio De Janeiro, Brazil, Dec. 5-9, 1999, pp. 452-456.
Wang, Y-P E., et al., "Cell Search Algorithms and Optimization in W-CDMA," 2000 IEEE 51st Vehicular Technology Conference Proceedings, Tokyo, Japan, May 15-18, 2000, pp. 81-86.

* cited by examiner

*Primary Examiner*—Shuwang Liu
*Assistant Examiner*—David Huang
(74) *Attorney, Agent, or Firm*—Lisa K. Jorgenson; David V. Carlson

(57) ABSTRACT

Two preferred embodiments provide slot synchronization of an initial cell search. Two Finite Impulse Response (FIR) filters are used to correlate the synchronization codes transmitted in the downlink (forward link). A sign bit is taken after the first FIR to significantly reduce the hardware requirements for the second FIR, and thus the whole system. The correlated results from the second FIR can be further processed using two different algorithms. The first adds a square operation to the correlated results whilst the second takes the magnitude before passing to the next stage. Regardless of which algorithm is adopted, the results are accumulated (I and Q), instead of averaged, and stored in a memory location for each successive correlation over the same location in different slots. The physical-layer processor (PLP) then reads the accumulated results from the memory location and searches for the peak position corresponding to the slot boundary.

22 Claims, 9 Drawing Sheets

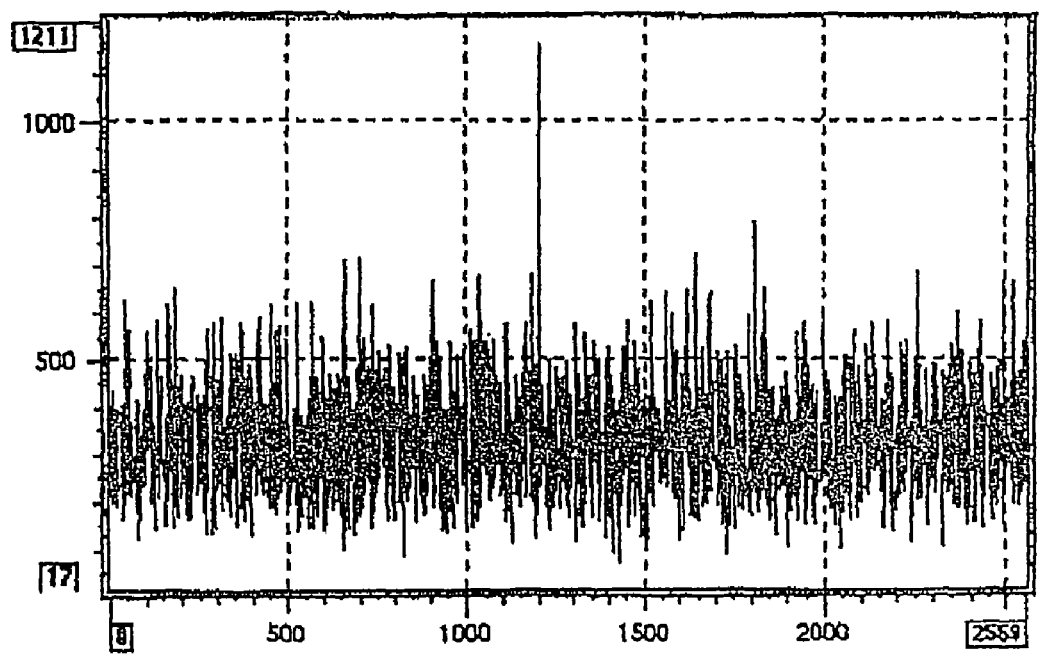
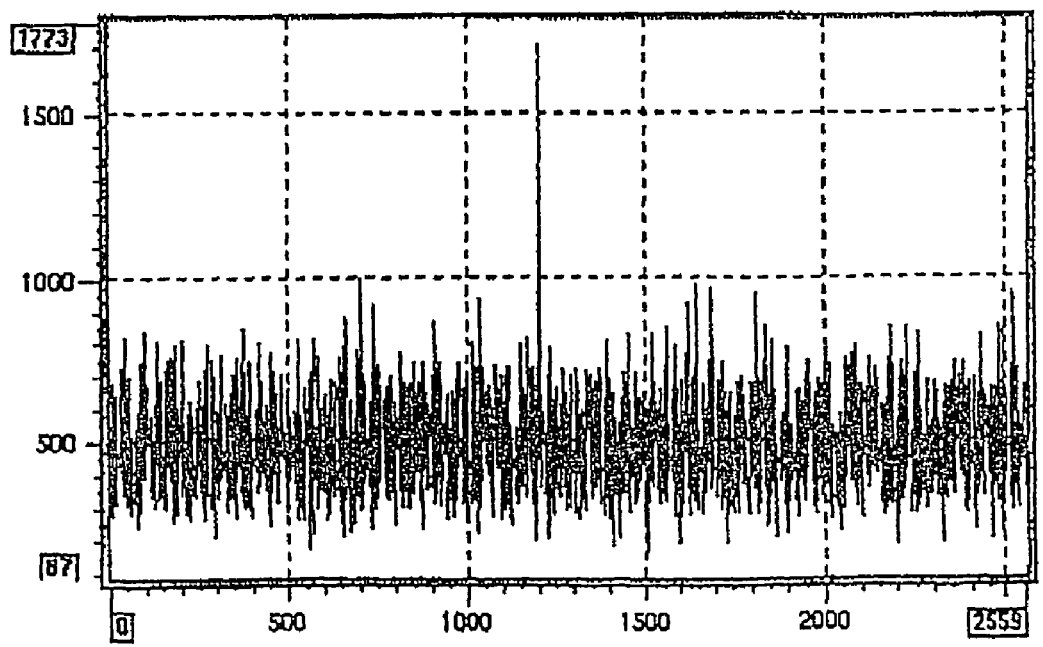

Detection Probability vs. Acquisition Time

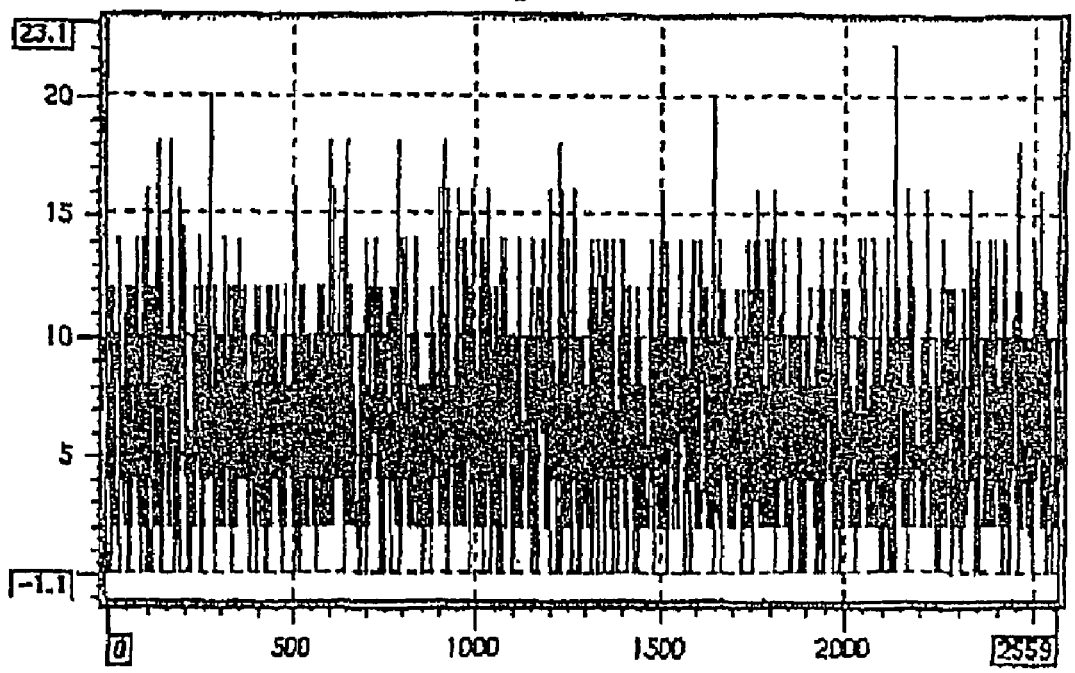
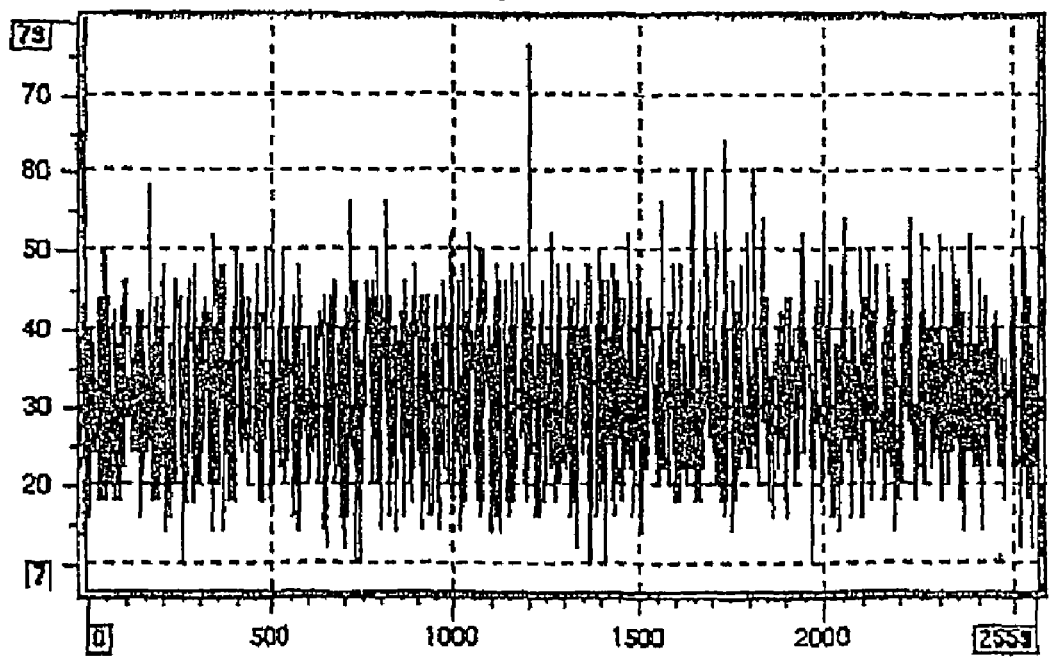

Detection Probability vs. Acquisition Time

Table 1

Detection probability and error probability for slot synchronisation ($r = 1$).

| No. of slots for accumulation, $n_t$ | $P_d$ | $P_e$ |
|---|---|---|
| 1 | 0.055 | 0.945 |
| 5 | 0.556 | 0.444 |
| 10 | 0.887 | 0.113 |
| 15 | 0.967 | 0.033 |
| 30 | 0.998 | 0.002 |

Table 2

Acquisition time and detection probability for different number of attempts.

| $r$ | $n_t = 1$ | | $n_t = 5$ | | $n_t = 10$ | | $n_t = 15$ | | $n_t = 30$ | |
|---|---|---|---|---|---|---|---|---|---|---|
| | $P_d$ | $t_a$ | $P_d$ | $t_a$ | $P_d$ | $t_a$ | $P_d$ | $t_a$ | $P_d$ | $t_a$ |
| 1 | 0.055 | 2 | 0.556 | 6 | 0.887 | 11 | 0.967 | 16 | 0.998 | 31 |
| 2 | 0.107 | 4 | 0.803 | 12 | 0.987 | 22 | 0.999 | 32 | 1 | 62 |
| 3 | 0.156 | 6 | 0.912 | 18 | 0.999 | 33 | 1 | 48 | 1 | 93 |

Table 3

Detection probability and error probability for slot synchronisation ($r = 1$).

| No. of slots for accumulation, $n_t$ | $P_d$ | $P_e$ |
|---|---|---|
| 1 | 0.043 | 0.957 |
| 5 | 0.517 | 0.483 |
| 10 | 0.869 | 0.131 |
| 15 | 0.962 | 0.038 |
| 30 | 0.996 | 0.004 |

Table 4

Acquisition time and detection probability for different number of attempts.

| $r$ | $n_t = 1$ | | $n_t = 5$ | | $n_t = 10$ | | $n_t = 15$ | | $n_t = 30$ | |
|---|---|---|---|---|---|---|---|---|---|---|
| | $P_d$ | $t_a$ | $P_d$ | $t_a$ | $P_d$ | $t_a$ | $P_d$ | $t_a$ | $P_d$ | $t_a$ |
| 1 | 0.043 | 2 | 0.517 | 6 | 0.869 | 11 | 0.962 | 16 | 0.996 | 31 |
| 2 | 0.084 | 4 | 0.767 | 12 | 0.983 | 22 | 0.999 | 32 | 1 | 62 |
| 3 | 0.124 | 6 | 0.887 | 18 | 0.998 | 33 | 1 | 48 | 1 | 93 |

HIGH PERFORMANCE W-CDMA SLOT SYNCHRONISATION FOR INITIAL CELL SEARCH WITH REDUCED HARDWARE

TECHNICAL FIELD OF THE INVENTION

The present invention relates to a 3GPP ($3^{rd}$ Generation Partnership Project) W-CDMA (Wideband Code-Division Multiple Access) FDD (Frequency Division Duplex) mode system, and more particularly to a method for slot synchronisation for an initial cell search, both in terms of performance and resource requirements of the system.

BACKGROUND OF THE INVENTION

The following abbreviations are hereinafter employed in the specification, as are other standard industry terms:

| | |
|---|---|
| 3GPP | $3^{rd}$ Generation Partnership Project |
| AWGN | Additive White Gaussian Noise |
| BS | Base Station |
| CPICH | Common Pilot Channel |
| DL | Downlink |
| FDD | Frequency Division Duplex |
| FIR | Finite Impulse Response |
| H/W | Hardware |
| I | In-phase |
| PAR | Peak-to-Average Ratio |
| PSC | Primary Synchronisation Code |
| PLP | Physical Layer Processor |
| Q | Quadrature-phase |
| SSC | Secondary Synchronisation Code |
| SCH | Synchronisation Channel |
| SR | Shift Register |
| UE | User Equipment |
| W-CDMA | Wideband Code-Division Multiple Access |

When UE is powered on, the UE has no knowledge of the system timing of a transmitting cell. The 3GPP W-CDMA FDD standard specifies an initial cell search procedure to synchronise the UE reception timing to that of the serving cell.

The initial cell search procedure includes three steps, namely: slot synchronisation; frame synchronisation and codegroup identification; and scrambling-code identification.

Generally, the goal of slot synchronisation is to obtain the slot timing reference by analysis of synchronisation sequences transmitted in each cell by the system. Frame synchronisation and codegroup identification is used to determine the transmitting frame boundary as well as the codegroup to which the primary scrambling code belongs. Scrambling-code identification is used to identify the primary scrambling code used by the base station (BS) to transmit a common pilot channel (CPICH).

The Synchronisation Channel (SCH), being the synchronisation sequence, is a downlink signal that consists of two sub-channels, the Primary and Secondary SCH. The 10 ms radio frames of the Primary and Secondary SCH are divided into 15 slots, each having a length of 2560 chips. FIG. 1 illustrates the general structure of the SCH radio frame. The primary synchronisation code (PSC) is the same for each cell, and the secondary synchronisation code (SSC) is different for each cell. PSC is intended to achieve slot synchronisation whilst SSC is adopted to achieve frame synchronisation.

The first step in the baseband for the UE to synchronise to the serving cell is to perform an initial cell search. There are altogether three steps in a cell search procedure. This invention is directed towards the first step of the cell search, namely slot synchronisation.

The principle used in slot synchronisation is to perform correlation over the received PSC. This correlation is repeated for as long as the length of a slot, i.e., 2560 chip duration. A profile of 2560 locations in a slot is then constructed. By determining the peak of the profile, the slot boundary can be determined.

Examination on the PSC sequence suggests that a FIR of length 256 is necessary to perform the correlation. However, such an FIR requires a large piece of hardware for realisation. In order to reduce the cost of implementation, it is necessary to look for other possibilities of reducing hardware requirements while maintaining acceptable performance.

This identifies a need for a new method of slot synchronisation which overcomes the problems inherent in the prior art.

DISCLOSURE OF INVENTION

The present invention is directed towards providing a method for achieving improved slot synchronisation.

The present invention seeks to outline two preferred embodiments for slot synchronisation of an initial cell search for Third-Generation Partnership Project (3GPP) Wideband Code-Division Multiple Access (W-CDMA) Frequency Division Duplex (FDD) mode system. Two Finite Impulse Response (FIR) filters are used to correlate the synchronisation codes transmitted in the downlink (forward link). Sign bit is taken after the first FIR to significantly reduce the hardware requirements for the second FIR, and thus the whole system. The correlated results from the second FIR can be further processed using two different algorithms. The first is to add a square operation to the correlated results whilst the second is to take the magnitude before passing to the next stage. Regardless of which algorithm is adopted, the results are accumulated, instead of averaged, and stored in a memory location for each successive correlation over the same location in different slots. The physical-layer processor (PLP) then reads the accumulated results from the memory location and searches for the peak position. This peak position corresponds to the actual slot boundary. Note that the I and Q branches are processed independently and the profiles are combined using accumulation for system performance improvement.

The present invention seeks to provide a method for slot synchronisation for an initial cell search, using two finite impulse response (FIR) filters, the method including the steps of:

synchronisation hardware of the user equipment (UE) receiving an I and a Q signal;

simultaneously calculating the results from a first FIR for the I and Q signals;

simultaneously obtaining the sign bit after the first FIR for the I and Q signals;

simultaneously calculating the results for the second FIR for the I and Q signals;

processing the second FR for the I signal and the second FIR for the Q signal using an algorithm, thereby providing accumulated results;

storing the accumulated results from the algorithm in a memory location;

successively processing the second FIR for the I signal and the second FIR for the Q signal according to the algorithm, over the same location in different slots and storing the successive accumulated results in the memory location; and a physical-layer processor (PLP) reading the successive accumulated results from the memory location and searching for the peak location which corresponds to the actual slot boundary.

The present invention according to one aspect seeks to provide that the algorithm includes: determining the square of the sum of the components of the second FIR for the I signal, and adding this to the square of the sum of the components of the second FIR for the Q signal.

The present invention according to another aspect seeks to provide that the algorithm includes: determining the magnitude of the sum of the components of the second FIR for the I signal, and adding this to the magnitude of the sum of the components of the second FIR for the Q signal.

In accordance with a specific embodiment of the present invention it is sought to be provided that the accumulated results are stored in a 16-bit memory location to build a profile of 2560 chips in length.

In a broad form, the present invention provides that the successive accumulated results are accumulated over $n_s$ slots and averaging is not used.

In a further broad form, the peak location corresponds to the received slot boundary.

In accordance with a further specific embodiment of the present invention it is sought to be provided that the required hardware at the second FIR is reduced due to adoption of the sign bit after the first FIR.

The present invention according to another aspect seeks to provide that the second FIR uses 241 taps.

The present invention according to yet another aspect seeks to provide that the method avoids rounding or truncation error caused by averaging.

The present invention according to still yet another aspect seeks to provide that the first FIR is reused for the secondary synchronisation.

In a preferred form of the invention a detection probability of approximately 96.7% is obtained in an AWGN channel when accumulated over 15 slots.

In another preferred form of the invention a detection probability of approximately 96.2% is obtained in an AWGN channel when accumulated over 15 slots.

In another preferred form of the invention there is provided a method for slot synchronisation for an initial cell search, substantially as herein described with reference to the accompanying figures and tables.

BRIEF DESCRIPTION OF THE FIGURES

The present invention will become apparent from the following description, which is given by way of example only, of a preferred but non-limiting embodiment thereof, described in connection with the accompanying figures and tables, wherein:

FIG. 5 illustrates the correlation profile after accumulation over 10 slots for a preferred embodiment of the present invention. This is the correlation profile (2560 positions for 1× sampling) between the incoming DL signals and the PSC code after accumulation over 10 slot for Implementation 1;

FIG. 6 illustrates the correlation profile after accumulation over 15 slots for a preferred embodiment of the present invention. This is the correlation profile (2560 positions for 1× sampling) between the incoming DL signals and the PSC code after accumulation over 15 slot for Implementation 1;

FIG. 9 illustrates the correlation profile after accumulation over 1 slot for an alternate preferred embodiment of the present invention. This is the correlation profile (2560 positions for 1× sampling) between the incoming DL signals and the PSC code after accumulation over 1 slot for Implementation 2;

FIG. 10 illustrates the correlation profile after accumulation over 5 slots for an alternate preferred embodiment of the present invention. This is the correlation profile (2560 positions for 1× sampling) between the incoming DL signals and the PSC code after accumulation over 5 slot for Implementation 2;

Figure 1:
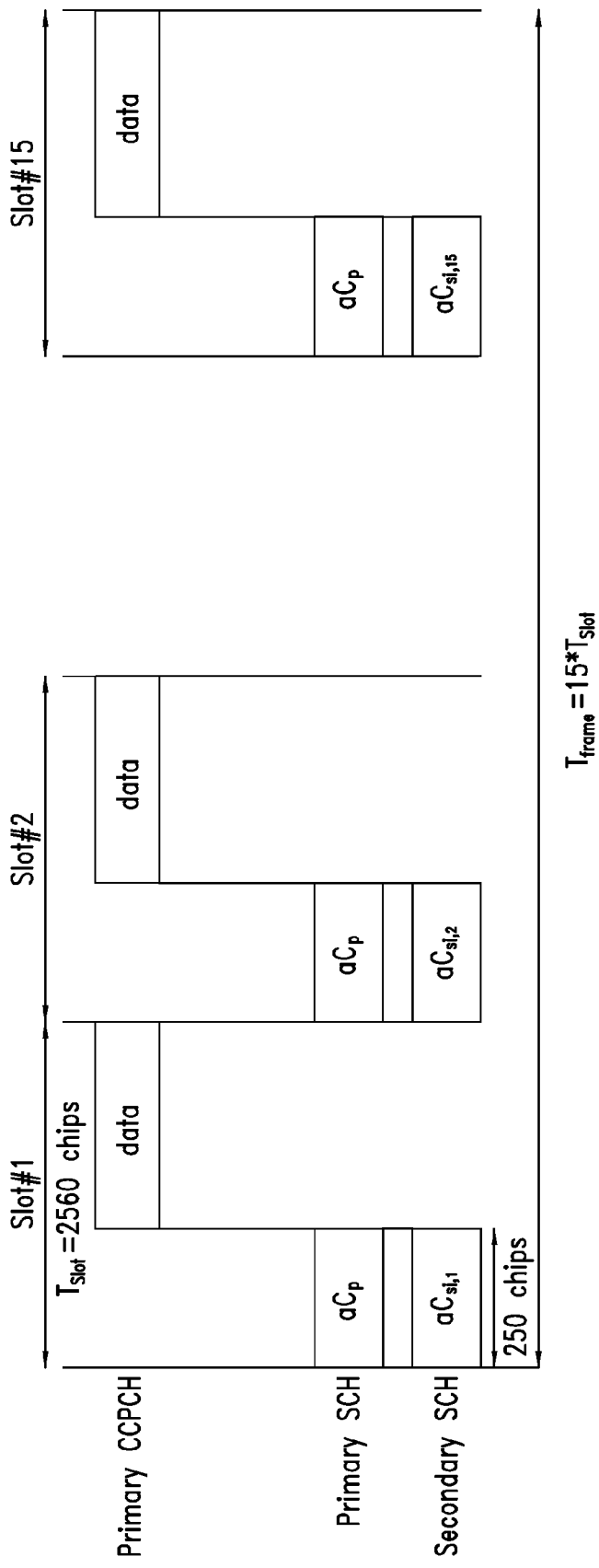
FIG. 1 illustrates the frame structure of a synchronisation channel. This is the frame structure of the SCH transmitted from the BS.

Table 1 presents the detection probability and error probability for slot synchronisation for implementation 1;

Table 2 presents the acquisition time and detection probability for different number of attempts for implementation 1;

Table 3 presents the detection probability and error probability for slot synchronisation for implementation 2;

Table 4 presents the acquisition time and detection probability for different number of attempts for implementation 2.

MODES FOR CARRYING OUT THE INVENTION

Overview

Sign-bit correlation provides significantly reduced resource requirement. Three methods for adopting sign-bit correlation are considered hereinafter. The first is to take the sign bit at the input to the first FIR. The second is to take the sign bit after the first FIR and before the second FIR and the third possibility is to take the sign bit after the second FIR. Other possibilities do not make much difference in terms of resource requirements.

The first approach has the lowest hardware requirement but is volatile to the phase shift and deep fading of a mobile communication channel. Therefore, this approach requires a long acquisition time to get a reliable slot boundary. The second approach has a slightly higher hardware requirement than the first approach. However, this approach has the ability of reducing the effect of phase shift and deep fading by taking the sign bit only after going through a 16-stage FIR. Therefore, reducing the acquisition time significantly. The third approach basically does not save significant hardware resources although the third approach performs the best of the three. Judging from the hardware requirements as well as the performance of each approach, the second approach seems to have a good balance of these two requirements. In this connection, it is chosen to be implemented for the 3GPP W-CDMA FDD mode UE system.

The results after the 2nd FIRs (I and Q) are accumulated to build a profile of 2560 locations in the memory. For any subsequent results taken over more than 1 slot, the results are also simply accumulated to improve the profile. This operation saves hardware for averaging the results. After sufficient accumulation, the PLP software reads the profile from the memory and detect the peak of the profile. This peak location corresponds to the offset of the actual slot boundary to the slot boundary where the correlation was started. Consequently, the received timing can be adjusted to the actual slot boundary.

Slot synchronisation is achieved by means of detecting the Primary SCH (PSC), which is transmitted at the first 256 chips of each slot. The PSC is the same for every cell in the system. The PSC is modulated on the I and Q channels with identical real and imaginary components. The PSC is constructed from a so-called generalised hierarchical Golay sequence with good aperiodic auto correlation properties.

The PSC is generated by repeating a sequence a modulated by a Golay complementary sequence.

The sequence a is given by:

$a = <1, 1, 1, 1, 1, 1, -1, -1, 1, -1, 1, -1, 1, -1, -1, 1>$
and $b = <a, a, a, -a, a, a, -a, a, a, a, -a, a, a, a>$.

Therefore, the PSC is defined as:

$C_{psc} = y = (1+j) * b$ where the leftmost chip in the sequence corresponds to the chip transmitted first in time.

Procedure

Two (2) FIR filters are used. The 1st FIR has 16 taps of width 10 bits, whilst the 2nd FIR has 241 (256-15) taps of width 1 bit. Before starting correlation, the PLP (shown in FIG. 2) loads the coefficients onto the 1st FIR, where the coefficients correspond to the patterns of the a-sequence with the mapping '1' to '0' and '−1' to '1'.

Figure 2:
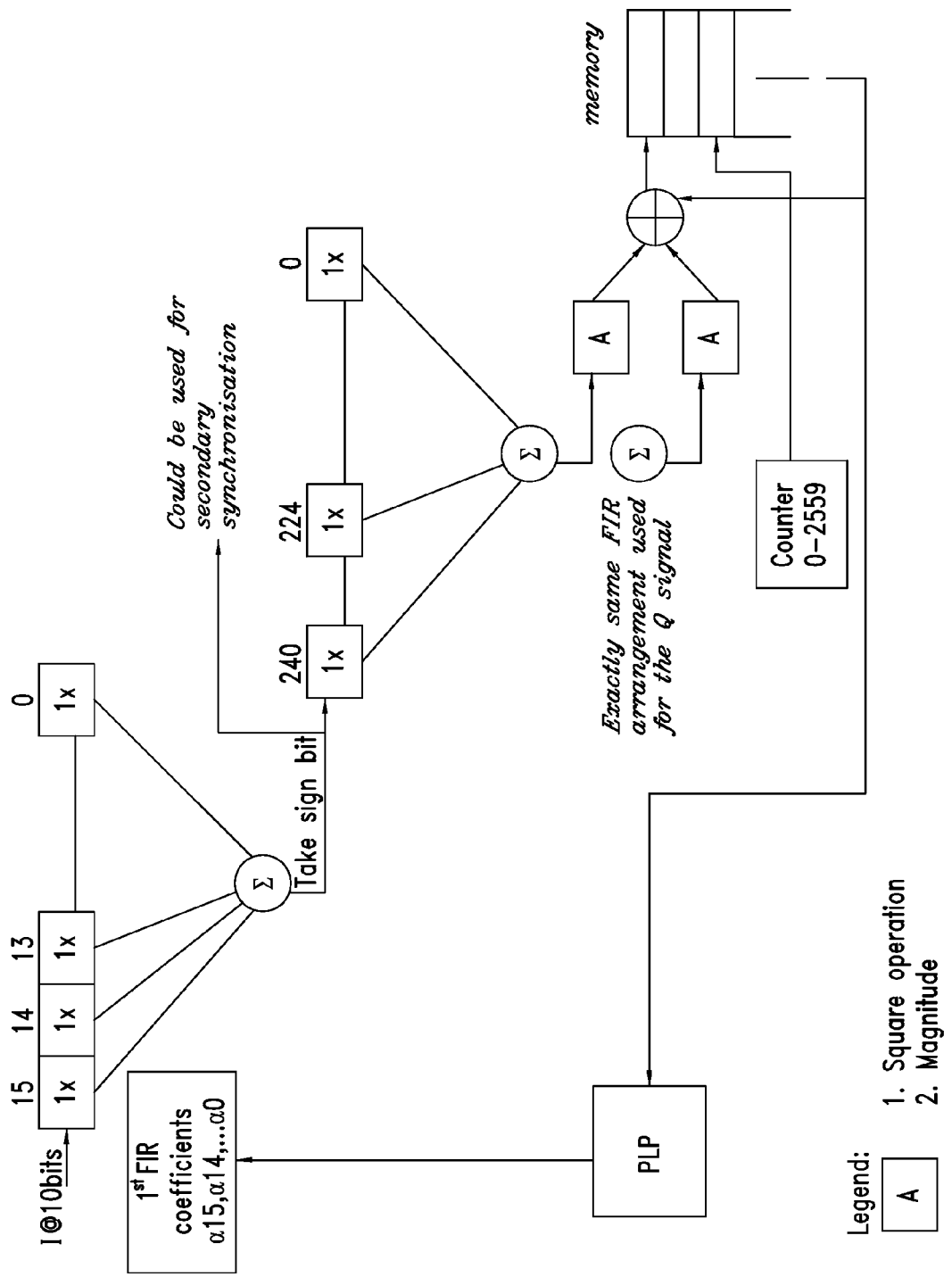
FIG. 2 illustrates a preferred embodiment of the present invention showing the architecture of slot synchronisation. This is the hardware layout of the implementation of slot synchronisation for an initial cell search.
Figure 3:
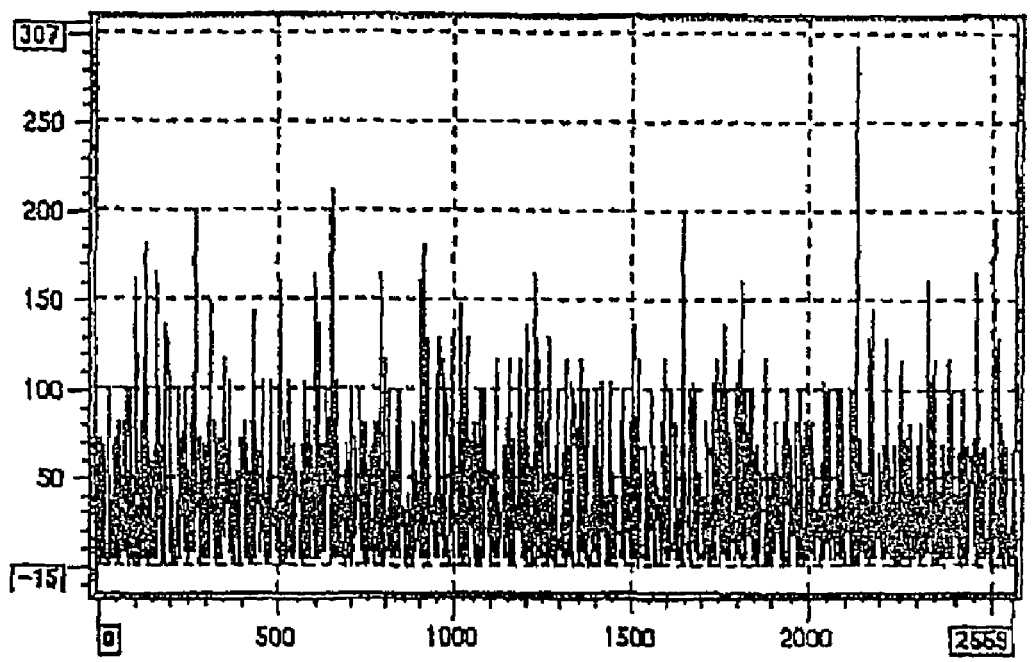
FIG. 3 illustrates the correlation profile after accumulation over 1 slot for a preferred embodiment of the present invention. This is the correlation profile (2560 positions for 1× sampling) between the incoming DL signals and the PSC code after accumulation over 1 slot for Implementation 1.
Figure 4:
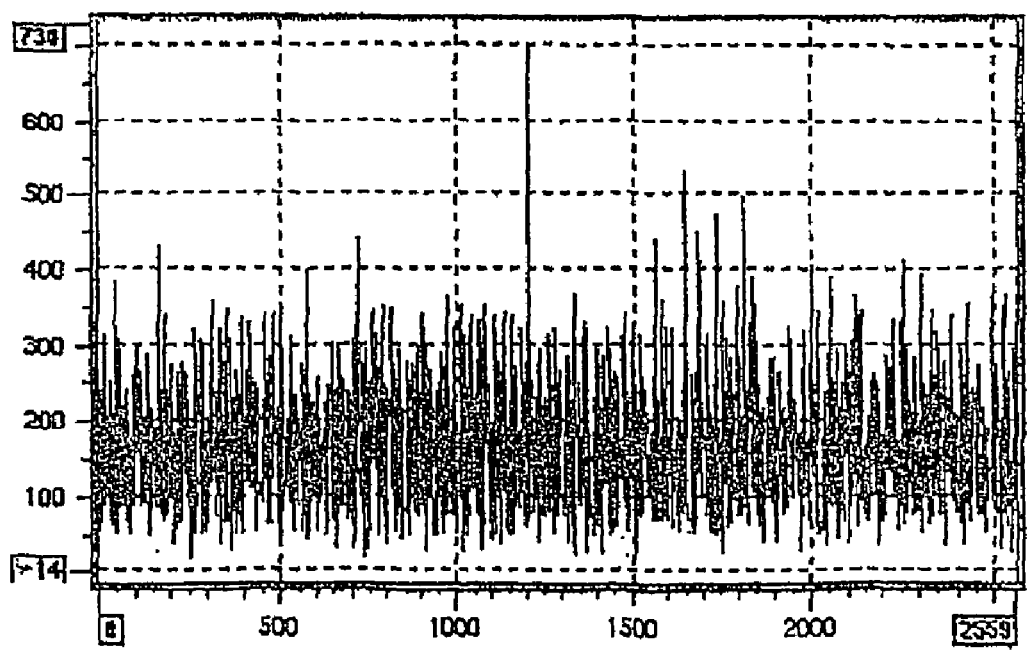
FIG. 4 illustrates the correlation profile after accumulation over 5 slots for a preferred embodiment of the present invention. This is the correlation profile (2560 positions for 1× sampling) between the incoming DL signals and the PSC code after accumulation over 5 slot for Implementation 1.
Figure 7:
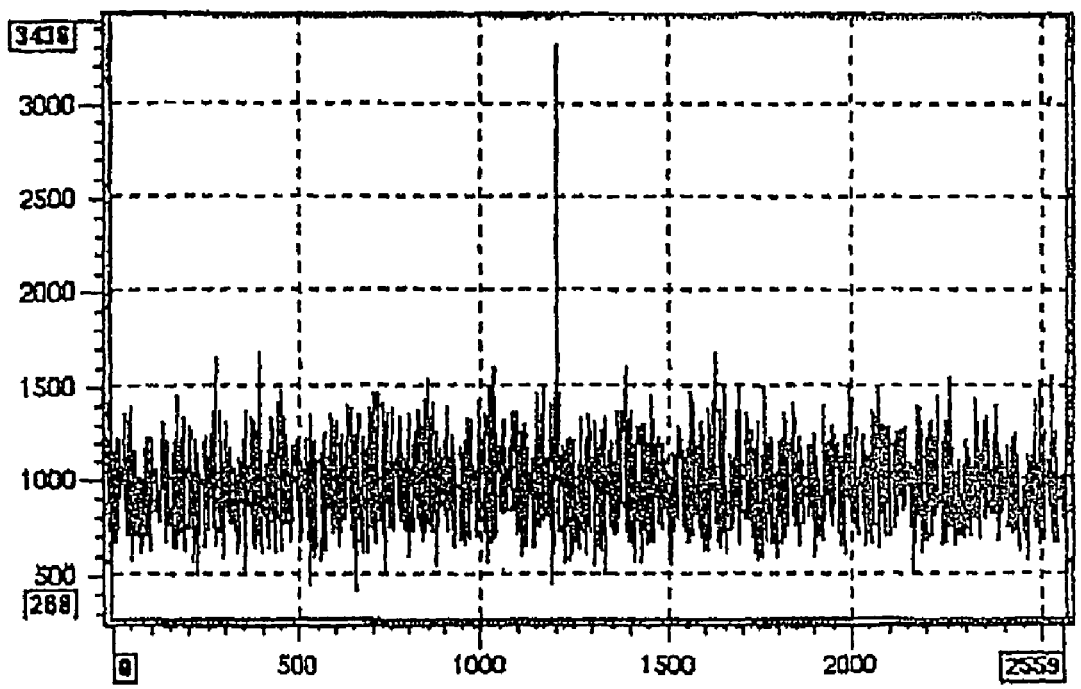
FIG. 7 illustrates the correlation profile after accumulation over 30 slots for a preferred embodiment of the present invention. This is the correlation profile (2560 positions for 1× sampling) between the incoming DL signals and the PSC code after accumulation over 30 slot for Implementation 1.

A '0' means addition and a '1' means subtraction at the summation block. Similarly, the coefficients for the 2nd FIR follow the pattern of the b-sequence with the same mapping. The coefficients for the 2nd FIR can be pre-programmed in the design since the flexibility of reusing this FIR for the secondary synchronisation is not needed. However, these coefficients only apply for tap number n×16, wherein n=0 to 15, as shown in FIG. 2.

The incoming signal (I or Q) is fed to the 1st FIR at 1× the chip rate. The sign bit (0 or 1) of the output (chip rate) from the 1st summation block is input to the 2nd FIR to produce a result from the 2nd summation block at chip rate. The calculation at the 2nd FIR is merely an XOR operation. The first 255 results from the 2nd FIR are discarded for flushing the FIRs. The same block of hardware is repeated independently for the I and Q branches of the received signal. The output from the independent I and Q branch are then accumulated and input to the profile. There are two preferred methods of implementing the A-block depicted in FIG. 2.

1) Implementation 1: The sum from the 2nd FIR is squared and added with the output from the other branch.

2) Implementation 2: The magnitude of the sum from the 2nd FIR is added with the output from the other branch.

The end result is stored in a 16-bit memory location to build a profile of 2560 in length. In order to achieve improved performance, the result is accumulated over $n_s$ slots. A counter, which runs from 0 to 2559, is used to keep track of the position in the profile to which the results should be accumulated and written. This counter starts after 255 chips time from the start of the correlation to compensate for the flushing of the FIRs.

Due to the use of sign bit for the output from the 1st FIR, the maximum value from the output of the 2nd FIR is ±16.

Calculation 1: After the square operation, the maximum value becomes 256 (8-bit unsigned) and this maximum value turns into 512 (9-bit unsigned) after the summation. For 16-bit memory, the maximum number of accumulations allowed is 16−9=7-bit, which is equivalent to 128.

Calculation 2: After taking the magnitude, the maximum value becomes 16 (4-bit unsigned) and this maximum value turns into 32 (5-bit unsigned) after the summation. For 16-bit memory, the maximum number of accumulations allowed is 16−5=11-bit, which is equivalent to 2048.

Therefore, the maximum number of slot accumulations can be up to 128 for implementation 1 and 2048 for implementation 2 before an overflow occurs. At the end of the accumulation, the PLP shall read the profile stored in the memory and identify the peak location. This peak location corresponds to the received slot boundary.

Simulation Results and Statistics

In the simulation, the parameters given in Table 4-1 of the document 3G TS25.133 v3.2.0 "Requirements for Support of Radio Resource Management (FDD) (Release 1999)", are used in conjunction with the assumption of zero frequency error in the receiver.

FIGS. 3 to 7 show simulation results for implementation 1, the squared combination.

Since the clock rate is higher than the chip rate (e.g., 8 times), the algorithm for finding the peak position from the 2560-location profile typically takes less than 1 slot. It can be assumed that the extra time required to start another slot synchronisation, in case the current synchronisation is in error (e.g., by checking the PAR), is 1 slot. Therefore, the acquisition time statistics (shown in Table 2) can be constructed from the detection probability table shown in Table 1.

Figure 8:
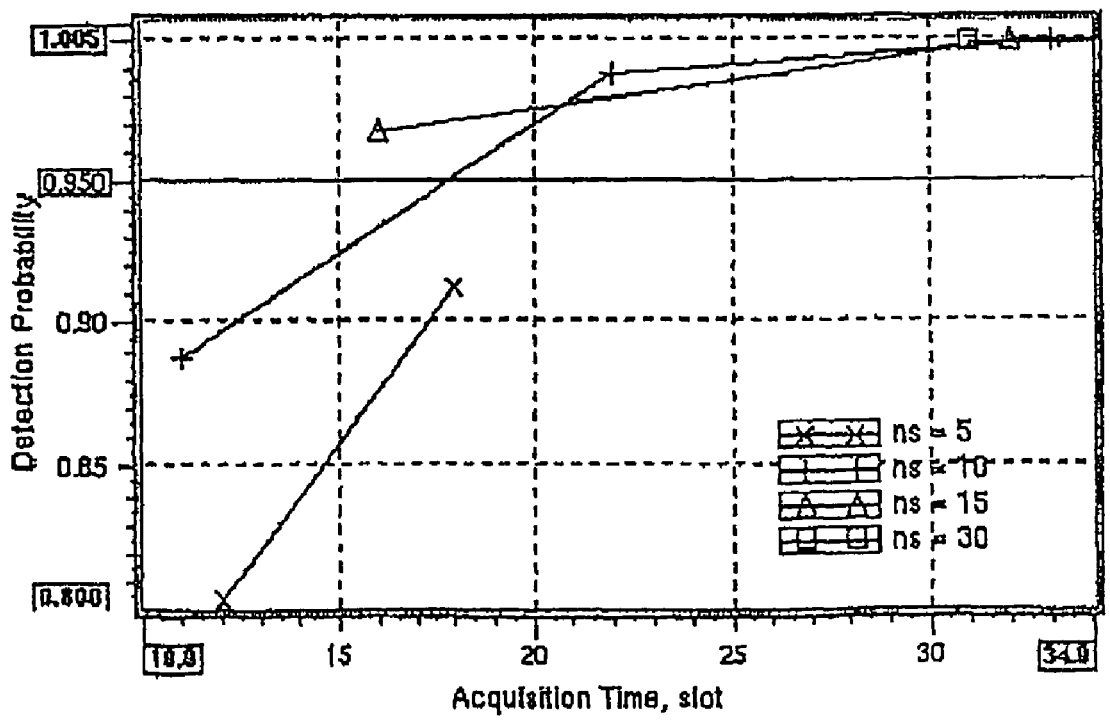
FIG. 8 illustrates the detection probability vs. acquisition the for various numbers of slot accumulations for a preferred embodiment of the present invention. This figure shows the detection probability curves for various numbers of slot accumulations for Implementation 1. The detection probability curves are used to decide the optimum number of slots needed for accumulation given a certain performance criteria.
Figure 11:
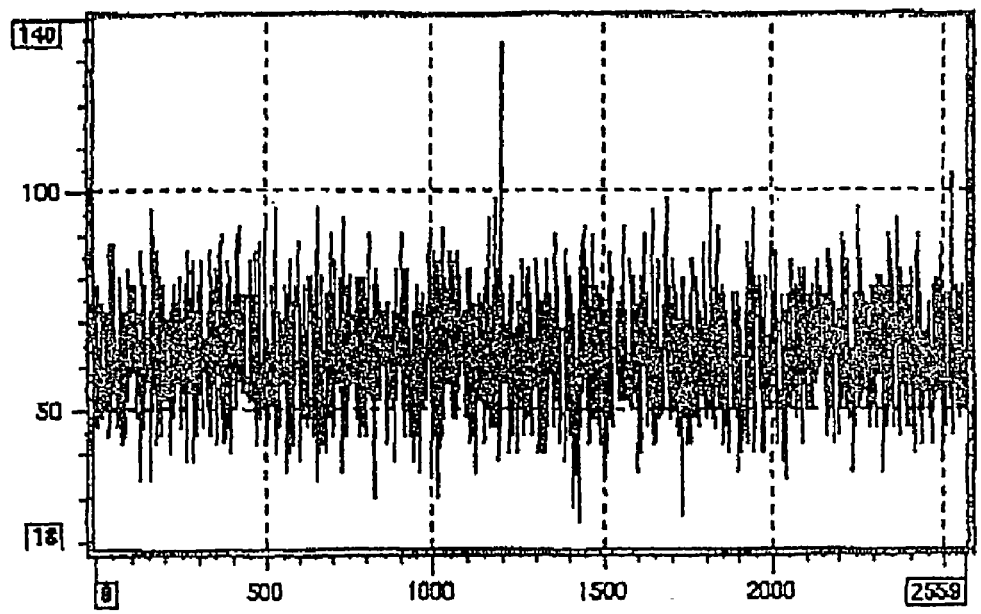
FIG. 11 illustrates the correlation profile after accumulation over 10 slots for an alternate preferred embodiment of the present invention. This is the correlation profile (2560 positions for 1× sampling) between the incoming DL signals and the PSC code after accumulation over 10 slot for Implementation 2.
Figure 12:
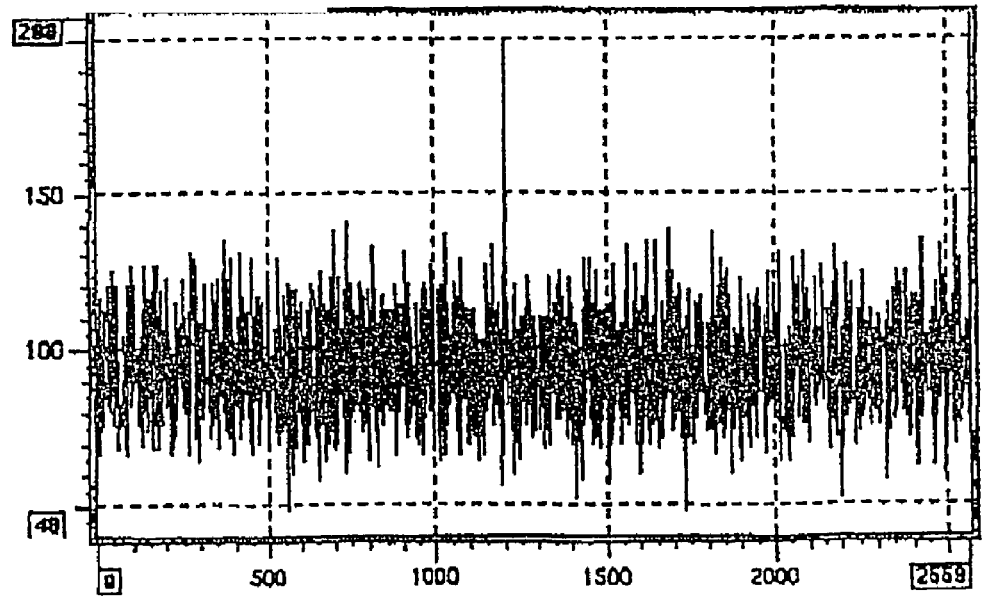
FIG. 12 illustrates the correlation profile after accumulation over 15 slots for an alternate preferred embodiment of the present invention. This is the correlation profile (2560 positions for 1× sampling) between the incoming DL signals and the PSC code after accumulation over 15 slot for Implementation 2.
Figure 13:
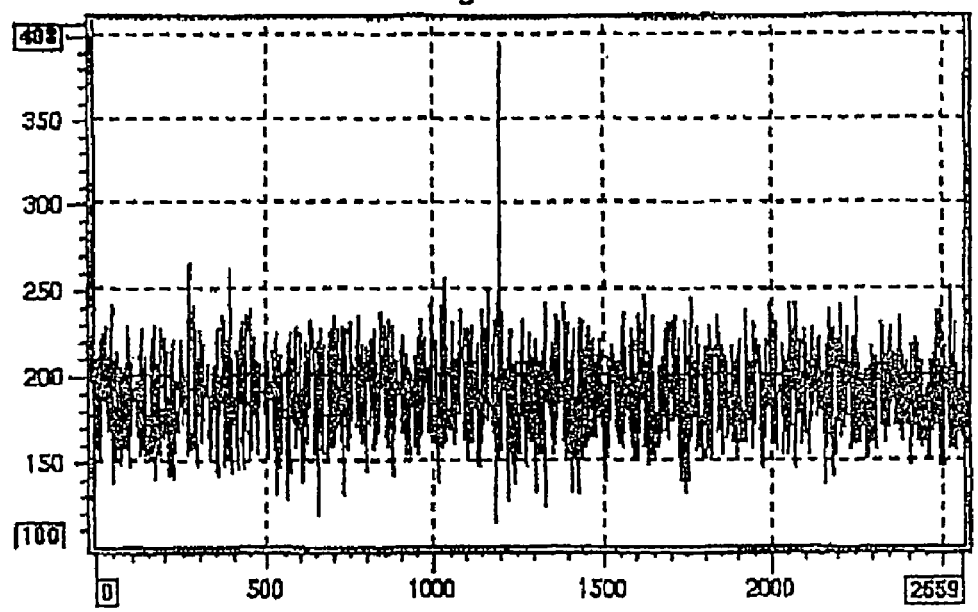
FIG. 13 illustrates the correlation profile after accumulation over 30 slots for an alternate preferred embodiment of the present invention. This is the correlation profile (2560 positions for 1× sampling) between the incoming DL signals and the PSC code after accumulation over 30 slot for Implementation 2.

Let:
r=number of attempts (retries)
$P_d$=detection probability
$P_e$=error probability
$t_a$=acquisition time $P_e=1-P_d$ After r attempts, $P_d=1-P_e^r$ $t_a \approx r \times (n_s+1)$ slots From FIG. 8, assuming a desired $P_d$ of 95%, $n_s$=15 should be chosen.

FIGS. 9 to 13 show simulation results for implementation 2, the magnitude combination.

Similar to implementation 1, the detection probability, error probability and acquisition time for implementation 2 are given in Table 3 and Table 4, respectively.

Figure 14:
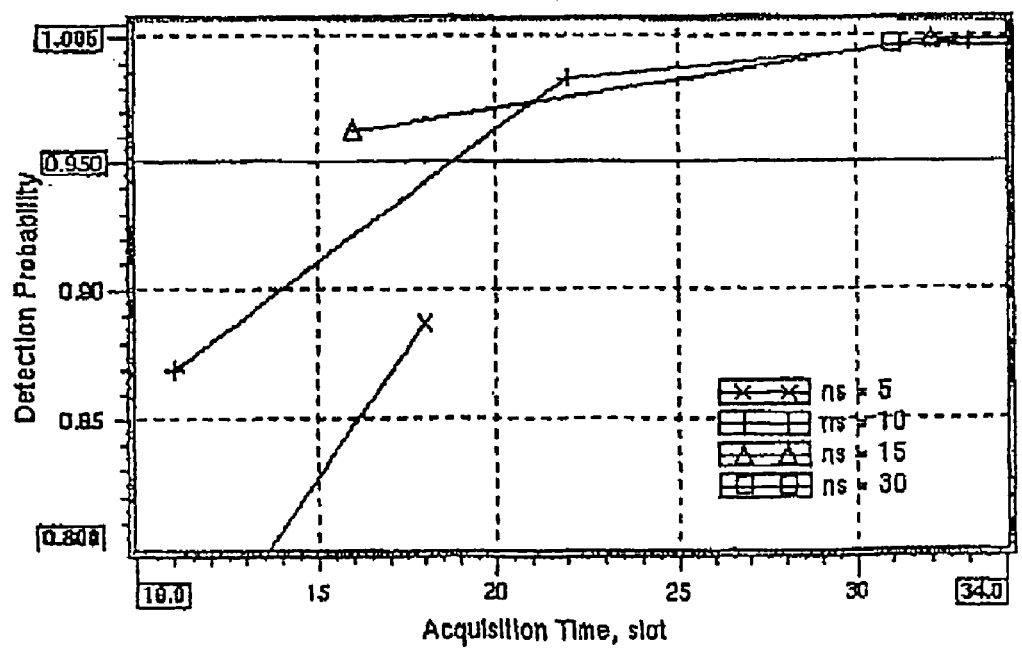
FIG. 14 illustrates the detection probability vs. acquisition time for various numbers of slot accumulations for an alternate preferred embodiment of the present invention. This figure shows the detection probability curves for various numbers of slot accumulations for Implementation 2. The detection probability curves are used to decide the optimum number of slots needed for accumulation given a certain performance criteria.

From FIG. 14, assuming a desired $P_d$ of 95%, $n_s$=15 should be chosen.

Advantages of the present invention include:

The adoption of sign bit after the $1^{st}$ FIR reduces hardware significantly at the $2^{nd}$ FIR. Thus the overall cost should be reduced;

The use of only 241 taps for the $2^{nd}$ FIR instead of 256 taps helps to reduce the hardware requirement;

The use of sign bit facilitates use of the accumulation instead of averaging when the results are written to the memory. This typically avoids the possibility of rounding or truncation error caused by averaging;

Accumulation is used for storing the correlation results instead of averaging. This saves hardware for an averaging operation;

The hardware for the $1^{st}$ FIR can be reused for the secondary synchronisation since the secondary synchronisation construction is similar to the primary synchronisation;

Implementation 1 has a detection probability of 96.7% in an AWGN channel (see Table 1) when accumulated over 15 slots. Implementation 2 has a detection probability of 96.2% when accumulated over 15 slots under the same channel condition as Implementation 1.

Two preferred methods of slot synchronisation for an initial cell search have been disclosed. Implementation 1 has a slightly higher hardware requirement but improved performance compared to implementation 2.

Thus, there has been provided in accordance with the present invention, a method for slot synchronisation for an initial cell search which satisfies the advantages set forth above.

The invention may also be said broadly to consist in the parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

Although the preferred embodiment has been described in detail, it should be understood that various changes, substitutions, and alterations can be made herein by one of ordinary skill in the art without departing from the scope of the present invention as hereinbefore described and as hereinafter claimed.

The claims defining the present invention are as follows:

1. A method for slot synchronization for an initial cell search, using finite impulse response (FIR) filters, the method comprising:
   receiving an I signal and a Q signal at synchronization hardware of user equipment;
   calculating first I results and first Q results by FIR filtering the I and Q signals, respectively;
   obtaining I and Q sign bits from the first I and Q results;
   calculating second I results and second Q results by respectively FIR filtering the I and Q signals using the I and Q sign bits, respectively;
   processing the second I results and the second Q results using an algorithm, thereby providing accumulated results;
   storing the accumulated results from the algorithm in a memory location,
   successively processing successive FIR filtered second I results and successive FIR filtered second Q results according to the algorithm, over the same location in different slots to obtain successive accumulated results and storing the successive accumulated results in the memory location; and
   reading the successive accumulated results from the memory location with a physical-layer processor and searching for a peak location which corresponds to an actual slot boundary.

2. A method as claimed in claim 1, wherein the algorithm includes: determining a value equal to the square of a sum of components of the second I results, and adding the value to the square of a sum of components of the second Q results.

3. A method as claimed in claim 2, wherein a detection probability of approximately 96.7% is obtained in an AWGN channel when accumulated over 15 slots.

4. A method as claimed in claim 1, wherein the algorithm includes: determining a magnitude of a sum of components of the second I results, and adding the magnitude to a magnitude of a sum of a components of the second Q results.

5. A method as claimed in claim 4, wherein a detection probability of approximately 96.2% is obtained in a AWGN channel when accumulated over 15 slots.

6. A method as claimed in claim 1, wherein the accumulated results are stored in a 16-bit memory location to build a profile of 2560 in length.

7. A method as claimed in claim 1, wherein the successive accumulated results are accumulated over $n_s$ slots and averaging is not used.

8. A method as claimed in claim 1, wherein the peak location corresponds to a received slot boundary.

9. A method as claimed in claim 1, wherein:
   calculating the first I results includes FIR filtering the I signal using a first FIR I-signal filter;
   calculating the first Q results includes FIR filtering the Q signal using a first FIR Q-signal filter;
   calculating the second I results includes FIR filtering the I signal using a second FIR I-signal filter; and
   calculating the second Q results includes FIR filtering the Q signal using a second FIR Q-signal filter.

10. A method as claimed in claim 9, wherein the second FIR I-signal filter uses 241 taps, instead of 256 taps.

11. A method as claimed in claim 1, wherein the method avoids rounding or truncation error caused by averaging.

12. A method as claimed in claim 1, wherein the first FIR I-signal filter is reused for a secondary synchronization.

13. A method as claimed in claim 1, wherein:
the first I results and first Q results are calculated simultaneously;
the I and Q sign bits are obtained simultaneously;
the second I results and second Q results are calculated simultaneously.

14. A method for slot synchronization for a cell search, using finite impulse response (FIR) filters, the method comprising:
receiving an I signal and a Q signal;
calculating from a first FIR filtering of the I and Q signals;
obtaining I and Q sign bits from the first I and Q results respectively;
calculating second I and Q results from a second FIR filtering of the I and Q signals, using the I and Q sign bits;
processing the second I and Q results using an algorithm, thereby providing accumulated results;
storing the accumulated results from the algorithm in a memory;
successively processing successive second I and Q results from successive second FIR filtering according to the algorithm, over a same location in different slots to obtain successive accumulated results and storing the successive accumulated results in the memory; and
searching the successive accumulated results from the memory for a peak location which corresponds to a slot boundary.

15. The method of claim 14, wherein the algorithm includes: determining a value equal to the square of a sum of components of the results from the second I results, and adding the value to the square of a sum of components of the second Q results.

16. The method of claim 14, wherein the algorithm includes: determining a magnitude of a sum of components of the second I results, and adding the magnitude to a magnitude of a sum of a components of the second Q results.

17. The method of claim 14, wherein:
wherein calculating the first I results includes FIR filtering the I signal using a first FIR I-signal filter;
calculating the second I results includes FIR filtering the I signal using a second FIR I-signal filter; and
the second FIR I-signal filter uses 241 taps, instead of 256 taps.

18. The method of claim 14, wherein:
calculating the first I results includes FIR filtering the I signal using a first FIR I-signal filter;
calculating the first Q results includes FIR filtering the Q signal using a first FIR Q-signal filter;
calculating the second I results includes FIR filtering the I signal using a second FIR I-signal filter; and
calculating the second Q results includes FIR filtering the first Q signal using a second FIR Q-signal filter.

19. A slot synchronization device, comprising:
a first finite impulse response (FIR) I-signal filter structured to receive an I signal and produce filtered I results, including an I sign bit;
a first FIR Q-signal filter structured to receive a Q signal and produce filtered Q results, including a Q sign bit;
a second FIR I-signal filter structured to obtain the I sign bit from the first FIR I-signal filter and produce second filtered I results;
a second FIR Q-signal filter structured to obtain the Q sign bit from the first FIR Q-signal filter and produce second filtered Q results;
processing means for processing the second filtered I and Q results using an algorithm, thereby providing accumulated results that are stored in a memory, wherein the processing means are structured to successively process successive second filtered I results and successive second filtered Q results according to the algorithm, over a same location in different slots to obtain successive accumulated results and store the successive accumulated results in the memory; and
a physical layer processor structured to search the successive accumulated results from the memory for a peak location which corresponds to a slot boundary.

20. The slot synchronization device of claim 19, wherein the algorithm includes: determining a value equal to the square of a sum of components of the second filtered I results, and adding the value to the square of a sum of components of the second Q results.

21. The slot synchronization device of claim 19, wherein the algorithm includes: determining a magnitude of a sum of components of the second filtered I results, and adding the magnitude to a magnitude of a sum of a components of the second filtered Q results.

22. The slot synchronization device of claim 19, wherein the second FIR I-signal filter uses 241 taps, instead of 256 taps.

* * * * *